(12) United States Patent
Raichelgauz et al.

(10) Patent No.: US 8,386,400 B2
(45) Date of Patent: Feb. 26, 2013

(54) UNSUPERVISED CLUSTERING OF MULTIMEDIA DATA USING A LARGE-SCALE MATCHING SYSTEM

(75) Inventors: Igal Raichelgauz, Herzelia (IL); Karina Odinaev, Haifa (IL); Yehoshua Y. Zeevi, Haifa (IL)

(73) Assignee: Cortica Ltd., Tirat Carmel (IL)

( * ) Notice: Subject to any disclaimer, the term of this patent is extended or adjusted under 35 U.S.C. 154(b) by 836 days.

(21) Appl. No.: 12/507,489

(22) Filed: Jul. 22, 2009

(65) Prior Publication Data

US 2009/0282218 A1    Nov. 12, 2009

Related U.S. Application Data

(63) Continuation-in-part of application No. 12/084,150, filed as application No. PCT/IL2006/001235 on Oct. 26, 2006, application No. 12/507,489, which is a continuation-in-part of application No. 12/195,863, filed on Aug. 21, 2008, which is a continuation-in-part of application No. 12/084,150, filed on Apr. 7, 2009.

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
*G06F 15/18* (2006.01)
(52) U.S. Cl. ....................................................... 706/12
(58) Field of Classification Search ........................ None
See application file for complete search history.

(56) References Cited

U.S. PATENT DOCUMENTS

| 6,240,423 | B1 | 5/2001 | Hirata |
| 6,243,375 | B1 | 6/2001 | Speicher |
| 6,611,628 | B1 | 8/2003 | Sekiguchi et al. |
| 6,754,435 | B2 | 6/2004 | Kim |
| 6,807,306 | B1 * | 10/2004 | Girgensohn et al. .......... 382/225 |
| 6,819,797 | B1 | 11/2004 | Smith et al. |
| 6,901,207 | B1 | 5/2005 | Watkins |
| 6,937,924 | B1 | 8/2005 | Statler et al. |

(Continued)

FOREIGN PATENT DOCUMENTS

| WO | WO0231764 | 4/2002 |
| WO | WO2007049282 | 5/2007 |

OTHER PUBLICATIONS

Iwamoto et al. "Image Signature Robust to Captions Superimposition for Video Sequence Identification", ICIP, 2006, pp. 3185-3188.*

(Continued)

*Primary Examiner* — Jeffrey A Gaffin
*Assistant Examiner* — Li-Wu Chang
(74) *Attorney, Agent, or Firm* — Myers Wolin, LLC (57) ABSTRACT

A method and apparatus for clustering a plurality of data elements. The method comprises receiving a plurality of cluster elements, each cluster element containing at least a data element; generating a clustering score for each cluster element of the plurality of cluster elements versus all other cluster elements of the plurality of cluster elements using a computing device; determining a size of a diagonal matrix having a size corresponding to the number of the plurality of cluster elements; placing the clustering score in a diagonal matrix in storage one clustering score for each pair of cluster elements; creating a new cluster element for each two cluster elements in the diagonal matrix having a clustering score that exceeds a threshold; and storing generated new cluster elements in the storage.

20 Claims, 6 Drawing Sheets

U.S. PATENT DOCUMENTS

| | | |
|---|---|---|
| 7,013,051 B2 | 3/2006 | Sekiguchi et al. |
| 7,031,980 B2 | 4/2006 | Logan et al. |
| 7,260,564 B1 | 8/2007 | Lynn et al. |
| 7,302,117 B2 | 11/2007 | Sekiguchi et al. |
| 7,313,805 B1 | 12/2007 | Rosin et al. |
| 7,376,572 B2 | 5/2008 | Siegel |
| 7,450,740 B2 | 11/2008 | Shah et al. |
| 2004/0068757 A1 | 4/2004 | Heredia |
| 2004/0153426 A1 | 8/2004 | Nugent |
| 2005/0177372 A1 | 8/2005 | Wang et al. |
| 2006/0236343 A1 | 10/2006 | Chang |
| 2006/0253423 A1 | 11/2006 | McLane et al. |
| 2007/0009159 A1 | 1/2007 | Fan |
| 2007/0074147 A1 | 3/2007 | Wold |
| 2007/0130159 A1 | 6/2007 | Gulli et al. |
| 2007/0244902 A1 | 10/2007 | Seide et al. |
| 2007/0253594 A1 | 11/2007 | Lu et al. |
| 2007/0268309 A1 | 11/2007 | Tanigawa et al. |
| 2008/0072256 A1 | 3/2008 | Boicey et al. |

OTHER PUBLICATIONS

Ahonen-Myka http://www.cs.helsinki.fi/u/linden/teaching/irm06/handouts/irm05_7.pdf, 2006, pp. 5.*

Maass, W. et al.: "Computational Models for Generic Cortical Microcircuits", Institute for Theoretical Computer Science, Technische Universitaet Graz, Graz, Austria, published Jun. 10, 2003.

International Search Report for the related International Patent Application PCT/IL2006/001235; Date of Mailing: Nov. 2, 2008.

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251 German National Research Center for Information Technology.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Natschlager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

International Search Authority: "Written Opinion of the International Searching Authority" (PCT Rule 43bis.1) including International Search Report for the related International Patent Application No. PCT/US2008/073852; Date of mailing: Jan. 28, 2009.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; Date of Issuance: Jul. 28, 2009.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

IPO Examination Report under Section 18(3) for corresponding UK application No. GB1001219.3, dated Sep. 12, 2011.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

* cited by examiner

|       | $S_1$ | $S_2$ | $S_3$ | $S_4$ | $S_5$ | $S_6$ | $S_7$ | $S_8$ | $S_9$ |
|-------|-------|-------|-------|-------|-------|-------|-------|-------|-------|
| $S_1$ |       | 9     | 0     | 0     | 1     | 1     | 2     | 13    | 0     |
| $S_2$ |       |       | 0     | 0     | 1     | 1     | 0     | 1     | 0     |
| $S_3$ |       |       |       | 5     | 5     | 0     | 0     | 0     | 0     |
| $S_4$ |       |       |       |       | 0     | 0     | 0     | 0     | 0     |
| $S_5$ |       |       |       |       |       | 1     | 17    | 5     | 0     |
| $S_6$ |       |       |       |       |       |       | 0     | 0     | 0     |
| $S_7$ |       |       |       |       |       |       |       | 0     | 13    |
| $S_8$ |       |       |       |       |       |       |       |       | 0     |
| $S_9$ |       |       |       |       |       |       |       |       |       |

FIG. 4

|       | $S_1S_2$ | $S_1S_8$ | $S_3S_4$ | $S_3S_5$ | $S_5S_7$ | $S_5S_8$ | $S_7S_9$ |
|-------|----------|----------|----------|----------|----------|----------|----------|
| $S_1S_2$ |  | X | 0,0<br>0,0 | 0,0<br>1,1 | 1,1<br>2,0 | 1,1<br>13,1 | 2,0<br>0,0 |
| $S_1S_8$ |  |  | 0,0<br>0,0 | 0,1<br>5,0 | 1,2<br>5,0 | X | 2,0<br>0,0 |
| $S_3S_4$ |  |  |  | X | 5,0<br>0,0 | 5,0<br>0,0 | 0,0<br>0,0 |
| $S_3S_5$ |  |  |  |  | X | X | 0,0<br>17,0 |
| $S_5S_7$ |  |  |  |  |  | X | X |
| $S_5S_8$ |  |  |  |  |  |  | 17,0<br>0,0 |
| $S_7S_9$ |  |  |  |  |  |  |  |

FIG. 5

|       | $S_1S_2$ | $S_1S_8$ | $S_3S_4$ | $S_3S_5$ | $S_5S_7$ | $S_5S_8$ | $S_7S_9$ |
|-------|----------|----------|----------|----------|----------|----------|----------|
| $S_1S_2$ |      | X        | 0        | 2        | 4        | 16       | 2        |
| $S_1S_8$ |      |          | 0        | 6        | 8        | X        | 2        |
| $S_3S_4$ |      |          |          | X        | 5        | 5        | 0        |
| $S_3S_5$ |      |          |          |          | X        | 0        | 17       |
| $S_5S_7$ |      |          |          |          |          | X        | X        |
| $S_5S_8$ |      |          |          |          |          |          | 17       |
| $S_7S_9$ |      |          |          |          |          |          |          |

FIG. 6

|       | $S_1S_2$ $S_5S_8$ | $S_1S_8$ $S_5S_7$ | $S_3S_5$ $S_7S_9$ | $S_5S_8$ $S_7S_9$ |
|-------|-------------------|-------------------|-------------------|-------------------|
| $S_1S_2S_5S_8$ |          | X                 | X                 | X                 |
| $S_1S_8S_5S_7$ |          |                   | X                 | X                 |
| $S_3S_5S_7S_9$ |          |                   |                   | X                 |
| $S_5S_8S_7S_9$ |          |                   |                   |                   |

UNSUPERVISED CLUSTERING OF MULTIMEDIA DATA USING A LARGE-SCALE MATCHING SYSTEM

CROSS-REFERENCE TO RELATED APPLICATIONS

This application is a continuation-in-part of:
(1) U.S. patent application Ser. No. 12/084,150 filed on Apr. 25, 2008, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006; and
(2) U.S. patent application Ser. No. 12/195,863, filed Aug. 21, 2008, now pending, which claims priority under 35 USC 119 from Israeli Application No. 185414, filed on Aug. 21, 2007, and which is also a continuation-in-part of the above-referenced U.S. patent application Ser. No. 12/084,150.

All of the applications referenced above are herein incorporated by reference.

TECHNICAL FIELD

The invention relates clustering of multimedia data elements, compressing the clusters and matching new content to these clusters.

BACKGROUND OF THE INVENTION

With the abundance of multimedia data made available through various means in general and the Internet and worldwide web (WWW) in particular, there is also a need to provide for effective ways of searching for such multimedia data. Searching for multimedia data in general and video data in particular may be challenging at best due to the huge amount of information that needs to be checked. Moreover, when it is necessary to find a specific content of video, the prior art cases revert to various metadata that describes the content of the multimedia data. However, such content may be complex by nature and not necessarily adequately documented as metadata.

The rapidly increasing multimedia databases, accessible for example through the Internet, calls for the application of effective means for search-by-content. Searching for multimedia in general and for video data in particular is challenging due to the huge amount of information that has to be classified. Prior art techniques revert to model-based methods to define and/or describe multimedia data. However, by its very nature, the structure of such multimedia data may be too complex to be adequately represented by means of metadata. The difficulty arises in cases where the target sought for multimedia data is not adequately defined in words, or respective metadata of the multimedia data. For example, it may be desirable to locate a car of a particular model in a large database of video clips or segments. In some cases the model of the car would be part of the metadata but in many cases it would not. Moreover, the car may be at angles different from the angles of a specific photograph of the car that is available as a search item. Similarly, if a piece of music, as in a sequence of notes, is to be found, it is not necessarily the case that in all available content the notes are known in their metadata form, or for that matter, the search pattern may just be a brief audio clip.

A system implementing a computational architecture (hereinafter "The Architecture") that is based on a PCT patent application number WO 2007/049282 and published on May 3, 2007, entitled "A Computing Device, a System and a Method for Parallel Processing of Data Streams", assigned to common assignee, and is hereby incorporated by reference for all the useful information it contains. The Architecture consists of a large ensemble of randomly, independently, generated, heterogeneous processing cores, mapping in parallel data-segments onto a high-dimensional space and generating compact signatures for classes of interest.

A vast amount of multimedia content exists today, whether available on the web or on private networks. Grouping efficiently such multimedia content into groups, or clusters, is a daunting assignment that requires having appropriate metadata for the clustering purposes, or having it done manually by identifying commonalities for the clustering purposes. Difficulties arise when portions of multimedia content are not readily recognized for the purpose of clustering. For example, if a picture of the Lincoln Memorial in the sunset is not tagged as such, then only a manual search will enable to cluster this image with other pictures of sunsets.

Therefore, it would be advantageous to provide a solution for unsupervised clustering of multimedia content that would cure the deficiencies of prior art techniques.

SUMMARY OF THE INVENTION

Certain embodiments of the invention include a method for clustering of data elements. The method comprises receiving a plurality of cluster elements, each cluster element containing at least a data element; generating a clustering score for each cluster element of the plurality of cluster elements versus all other cluster elements of the plurality of cluster elements using a computing device; determining a size of a diagonal matrix having a size corresponding to the number of the plurality of cluster elements; placing the clustering score in a diagonal matrix in storage one clustering score for each pair of cluster elements; creating a new cluster element for each two cluster elements in the diagonal matrix having a clustering score that exceeds a threshold; and storing generated new cluster elements in the storage.

Certain embodiments of the invention further include an apparatus for clustering a plurality of data elements. The apparatus comprises a source of cluster elements for clustering, each cluster element containing at least a data element; a storage; and a clustering unit adapted to perform at least: generating a clustering score for each cluster element of the plurality of cluster elements versus all other cluster elements of the plurality of cluster elements using a computing device; determining a size of a diagonal matrix having a size corresponding to the number of the plurality of cluster elements; placing the clustering score in a diagonal matrix in storage one clustering score for each pair of cluster elements; creating a new cluster element for each two cluster elements in the diagonal matrix having a clustering score that exceeds a threshold; and wherein generated new cluster elements are stored in the storage.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

A large collection of multimedia data elements calls for clustering of the multimedia data. Accordingly to certain exemplary embodiments of the invention multimedia data elements are clustered in an unsupervised manner. The invention describes a clustering technique which entails one comparison of every one of the multimedia data elements to all other multimedia data elements and determining a comparison score. Based on the score, clustering of the multimedia data elements having a score above a predetermined threshold. The process is then repeated for the clusters as they become larger clusters until a cycle where no more clustering can be achieved. In one embodiment instead of the multimedia data elements, the initial comparison is performed on Signatures unique to the multimedia data elements. The representation in clusters and clusters of clusters enables compression, storage and discovery of new content-related elements by matching to the generated clusters.

In one embodiment instead of the multimedia data elements, that include, but are not limited to, images, audio, video, fragments thereto, and any combination thereof, the initial comparison is performed on Signatures unique to the multimedia data elements. The comparison between all the pairs of the multimedia data elements' signatures yields the Inter-Match Matrix. The clustering is performed on this Inter-Match Matrix which is a sparse matrix. This process results in Clusters of Signatures. It should be noted that the same Signature can be related to more than one element, and several signatures can represent a single element. Thus, the clustering of the Signatures and the representation of the Cluster by a reduced set of signatures, which optimally spans the Cluster, enables reduced storage and effective representation for discovery of new content-elements related to the cluster. For example, a specific combination of the Signatures in the Cluster may lead to Match of new content-element, which originally were not part of the set the Cluster was based on. The method can be implemented in any applications which involve large-scale content-based clustering, recognition and classification of multimedia data. These applications include, for example, content-tracking, video filtering, multimedia taxonomy generation, video fingerprinting, speech-to-text, audio classification, object recognition, video search and any other applications that require content-based signatures generation and matching for large content volumes such as, web and other large-scale databases.

Certain embodiments of the invention include a framework, a method, a system and their technological implementations and embodiments, for large-scale matching-based multimedia Deep Content Classification (DCC). The system is based on an implementation of a computational architecture, The Architecture" referenced above. The Architecture consists of a large ensemble of randomly, independently, generated, heterogeneous processing computational cores, mapping in parallel data-segments onto a high-dimensional space and generating compact signatures for classes of interest.

In accordance with certain principles of the invention, a realization of The Architecture embedded in large-scale matching system (hereinafter "The System") for multimedia DCC may be used. The Architecture receives as an input stream, multimedia content segments, injected in parallel to all computational cores. The computational cores generate compact signatures for the specific content segment, and/or for a certain class of equivalence and interest of content-segments. For large-scale volumes of data, the signatures are stored in a conventional way in a database of size N (where N is an integer number), allowing match between the generated signatures of a certain content-segment and the signatures in the database, in low-cost, in terms of complexity and response time.

For the purpose of explaining the principles of the invention there is now demonstrated an embodiment of The System. Other embodiments are described in the patent applications which of which this patent application is a continuation-in-part of and are specifically incorporated herein by reference. Moreover, it is appreciated that other embodiments will be apparent to one of ordinary skill in the art.

Characteristics and advantages of the System include but are not limited to: The System is flat and generates signatures at an extremely high throughput rate; The System generates robust natural signatures, invariant to various distortions of the signal; The System is highly-scalable for high-volume signatures generation; The System is highly-scalable for matching against large-volumes of signatures; The System generates Robust Signatures for exact-match and/or partial-match with low-cost, in terms of complexity and response time; The System accuracy is scalable versus the number of computational cores, with no degradation effect on the throughput rate of processing; The throughput of The System is scalable with the number of computational threads, and is scalable with the platform for computational cores implementation, such as FPGA, ASIC, etc.; and, the signatures produced by The System are task-independent, thus the process of classification, recognition and clustering can be done independently from the process of signatures generation, in the superior space of the generated signatures.

Large-Scale Video Matching System—The System

The goal of a large-scale video matching system is effectively to find matches between members of large-scale Master DB of video content-segments and a large-scale Target DB of video content-segments. The match between two video content segments should be invariant to a certain set of statistical distortions performed independently on two relevant content-segments. Moreover, the process of matching between a certain content-segment from Master DB to Target DB consisting of N segments, cannot be done by matching directly the Master content-segment to all N Target content-segments, for large-scale N, since such a complexity of O(N), will lead to non-practical response times. Thus, the representation of content-segments by both Robust Signatures and Signatures is critical application-wise. The System embodies, but is not limited to, a specific realization of The Architecture for the purpose of Large-Scale Video Matching System.

Figure 1:
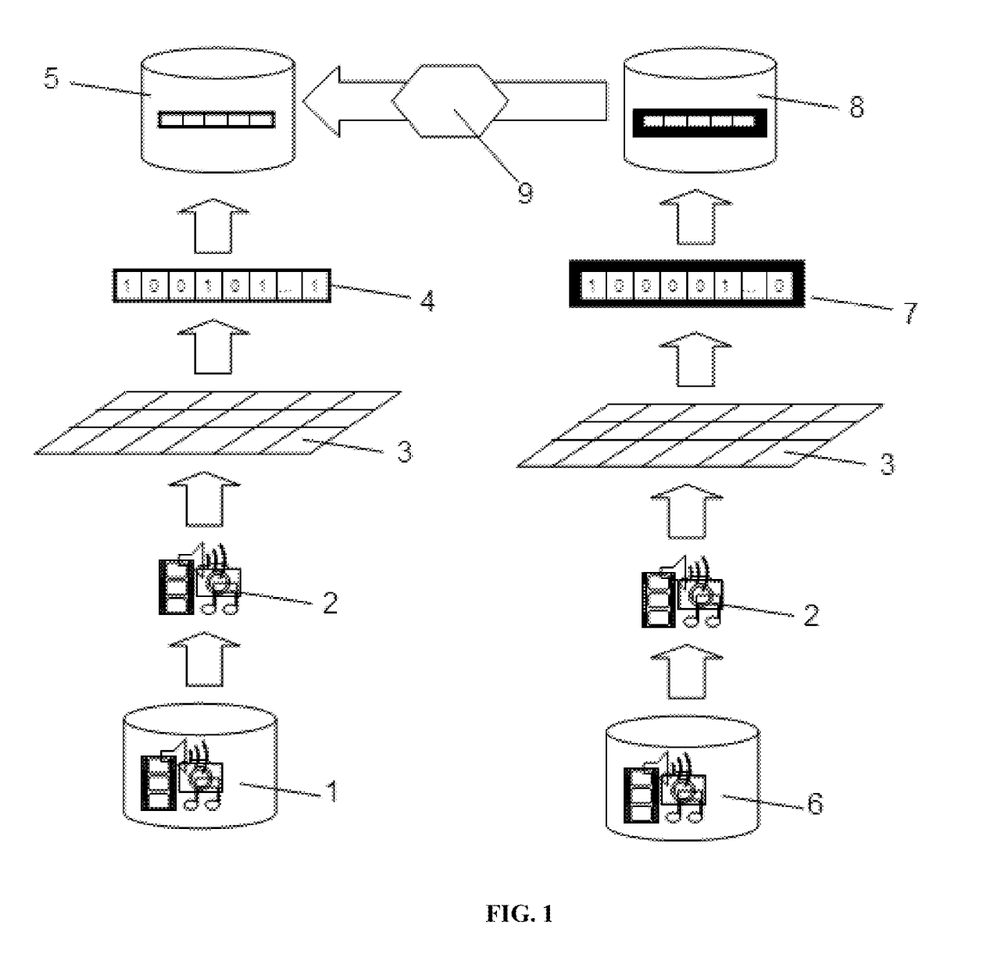
FIG. 1 is a block diagram showing the basic flow of The System for large-scale multimedia matching.

A high-level description of the process for large-scale video matching is depicted in FIG. 1. multimedia content segments (2) from Master and Target databases (6) and (1) are processed in parallel by a large number of independent computational Cores (3) that constitute the Architecture. Further details are provided in the cores generator for Large-Scale Video Matching System section below. The independent Cores (3) generate a Robust Signatures and Signatures (4) for Target content-segments and a Robust Signatures and Signatures for Master content-segments, which are further saved in a Master Robust Signatures and Signatures (5), and Robust Signatures and Signatures (8). An exemplary and non-limiting process of signature generation for an audio component is shown in detail in FIG. 2. Finally, Target Robust Signatures and/or Signatures are effectively matched, by a matching algorithm (9), to Master Robust Signatures and/or Signatures database to find all matches between the two databases.

To demonstrate an example of signature generation process, it is assumed, merely for the sake of simplicity and without limitation on the generality of the invention, that the signatures are based on a single frame, leading to certain simplification of the computational cores generation. This is further described in the cores generator for Large-Scale Video Matching System section. The system is extensible for signatures generation capturing the dynamics in-between the frames.

Signature Generation

Figure 2:
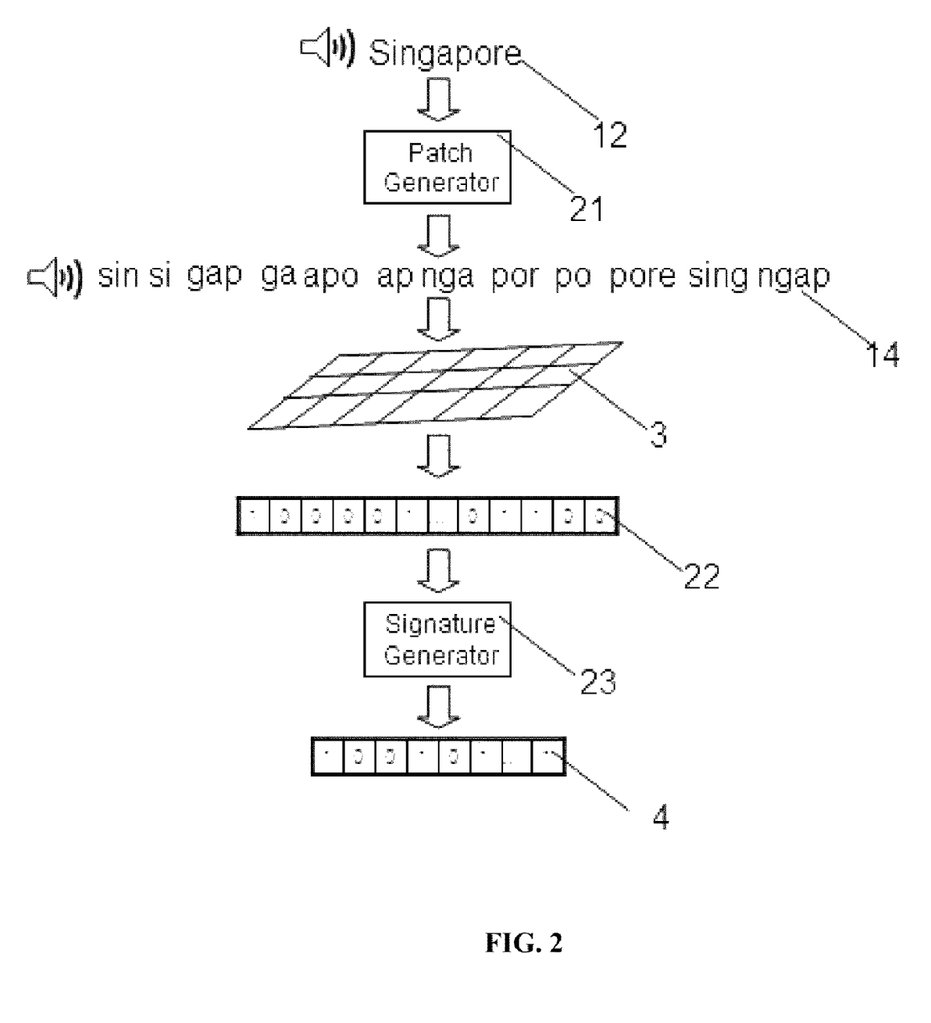
FIG. 2 is a diagram showing the flow of patches generation, response vector generation, and signature generation in a Large-Scale Speech-to-Text System implemented in accordance with certain embodiments of the invention.

The signatures generation process will be described with reference to FIG. 2. The first step in the process of signatures generation from a given speech-segment is to break-down the speech-segment to K (where K is an integer equal to or greater than 1) patches (14) of random length P (where P is an integer equal to or greater than 1) and random position within the speech segment (12). The break-down is performed by the patch generator component (21). The value of K and the other two parameters are determined based on optimization, considering the tradeoff between accuracy rate and the number of fast matches required in the flow process of the System. In the next step, all the K patches are injected in parallel to all L (where L is an integer equal to or greater than 1) computational Cores (3) to generate K response vectors (22). The Signature (4) is generated by the signature generator (23).

Creation of Signature Robust to Statistical Noise

In order to generate Robust Signatures, i.e., Signatures that are robust to additive, Gaussian, or other linear and not non-linear noise L computational cores, generated for Large-Scale Video Matching System are used. A frame i is injected to all the cores. The cores generate two binary response vectors $\vec{S}$—the Signature, and $\vec{RS}$—Robust Signature.

For generation of signatures robust to additive noise, such White-Gaussian-Noise, scratch, etc., but not robust to distortions, such as crop, shift and rotation, the core $C_i = \{n_i\}$ may consist of a single (LTU) node or more nodes. The node equations are:

$$V_i = \sum_j w_{ij} k_j$$

$n_i = \theta(V_i \text{ Th}_s)$; $\theta$ is a Heaviside step function; $w_{ij}$—coupling node unit (CNU) between node i and image component j (for example, grayscale value of a certain pixel j); $k_j$ is an image component j (for example, grayscale value of a certain pixel j); $\text{Th}_x$ is a constant Threshold value where x is 'S' for Signature and 'RS' for Robust Signature; and $V_i$ is a Coupling Node Value.

The Threshold values $\text{Th}_x$ are set differently for Signature generation and for Robust Signature generation. For example, for a certain distribution of $V_i$ values (for the set of nodes), the thresholds for Signature ($\text{TH}_S$) and Robust Signature ($\text{Th}_{RS}$) are set apart, after optimization, according to at least one or more of the following criteria:

I: For: $V_i > \text{Th}_{RS}$ $$1 - p(V > \text{Th}_S) = 1 - (1-\epsilon)^l \ll 1$$

$$1 - p(V > \text{Th}_S) - 1 - (1-\epsilon)^l \ll 1$$

i.e., given that l nodes (cores) constitute a Robust Signature of a certain image I, the probability that not all of these l nodes will belong to the Signature of same, but noisy image, $\tilde{-}$ is sufficiently low (according to a system's specified accuracy).

II: $p(V_i > \text{Th}_{RS}) \approx l/L$ i.e., approximately l out of the total L nodes can be found to generate Robust Signature according to the above definition.

III: Both Robust Signature and Signature are generated for certain frame i.

It should be understood that the creation of a signature is a unidirectional compression where the characteristics of the compressed data are maintained but the compressed data cannot be reconstructed. Therefore, a signature can be sued for the purpose of comparison to another signature without the need of comparison of the original data. The detailed description of the signature generation is discussed in more detail in the pending patent applications of which this patent application is a continuation-in-part of, and is hereby incorporated by reference.

Computational Cores Generation

Cores Generation is a process of definition, selection and tuning the Architecture parameters for a certain realization in specific system and application. The process is based on several design considerations, such as:

(a) The cores should be designed so as to obtain maximal independence, i.e. the projection from a signal space should generate a maximal pair-wise distance between any two cores' projections in a high-dimensional space.

(b) The cores should be optimally designed for the type of signals, i.e. the cores should be maximally sensitive to the spatio-temporal structure of the injected signal, for example, and in particular, sensitive to local correlations in time and space. Thus, in some cases a core represents a dynamic system, such as in states' space, phase space, edge of chaos, etc., which is uniquely used herein to exploit their maximal computational power.

(c) The cores should be optimally designed with regard to invariance to set of signal distortions, of interest in relevant application.

Unsupervised Clustering

Figure 3:
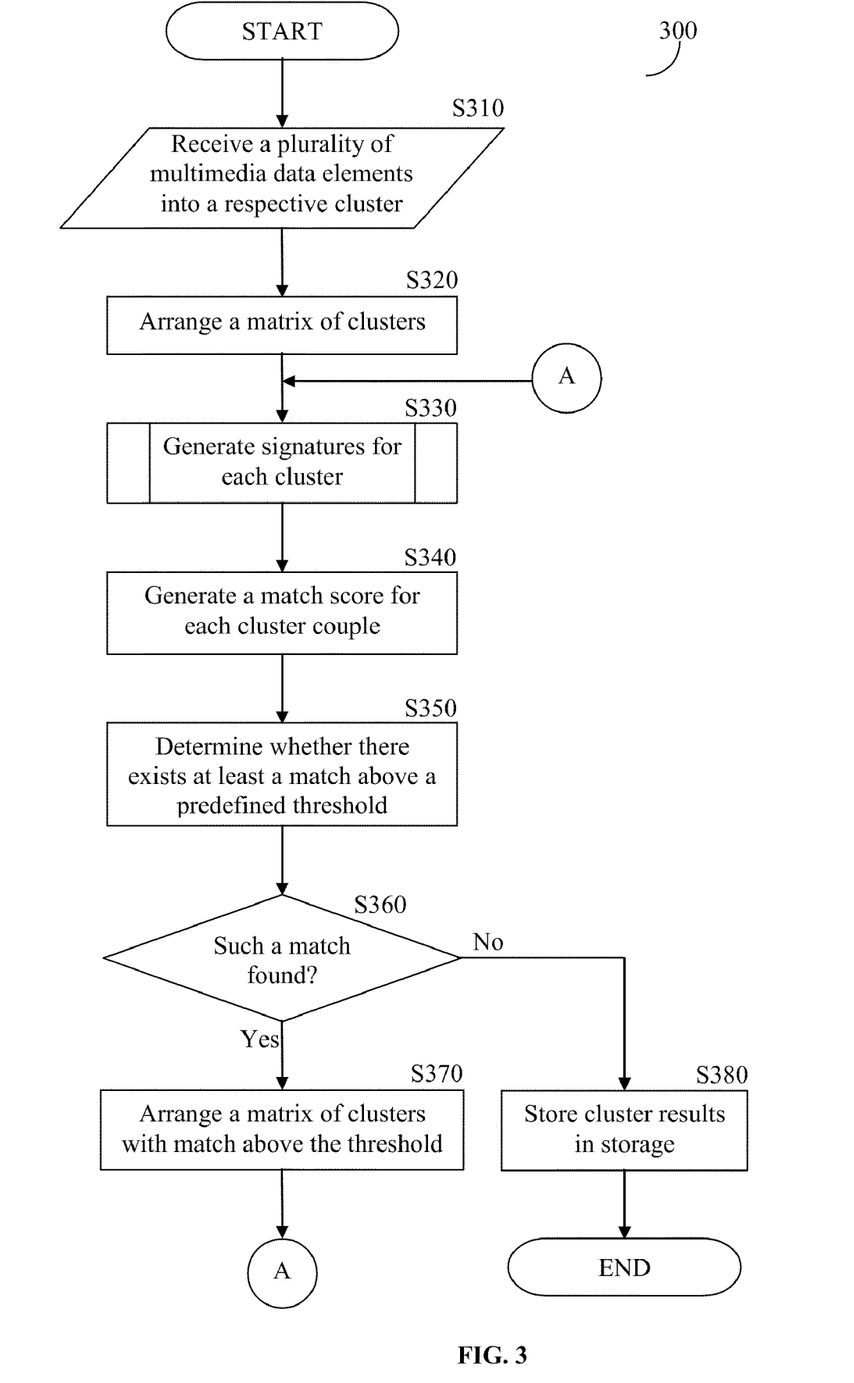
FIG. 3 is a flowchart of a method for unsupervised clustering based on a signature matching using The Architecture.

FIG. 3 shows an exemplary and non limiting flowchart 300 describes a method for unsupervised clustering implemented in accordance with an embodiment of the invention. In an exemplary embodiment, the method is based on signature matching that makes use of the Architecture. As noted above a multimedia data element may be a video, a video frame, a video clip, a picture, an audio recording, and other kinds of multimedia data elements, as well as fragments and/or combinations thereof. It should be further noted that the received multimedia data element may also be a portion of a full image, for example, without limitation, a logo that is shown on certain television shows, or a cartoon character used in a movie, and the like, and is not limited to visual images.

In S310 a plurality of multimedia data elements are received. In S320 the multimedia data elements are arranged in a diagonal two-dimensional matrix, as further explained with reference to FIGS. 4 through 7. Initially, each entry in the matrix is a cluster that comprises a single multimedia data element. In S330 signatures are generated in accordance with the principles of signature generation discussed herein above, for each and every of the plurality of multimedia data elements received. The signatures are generated as explained in more detail above, as well as in the co-pending patent applications of which this patent application is a continuation-in-part of. One of the signatures may be a Robust Signature.

Figure 4:
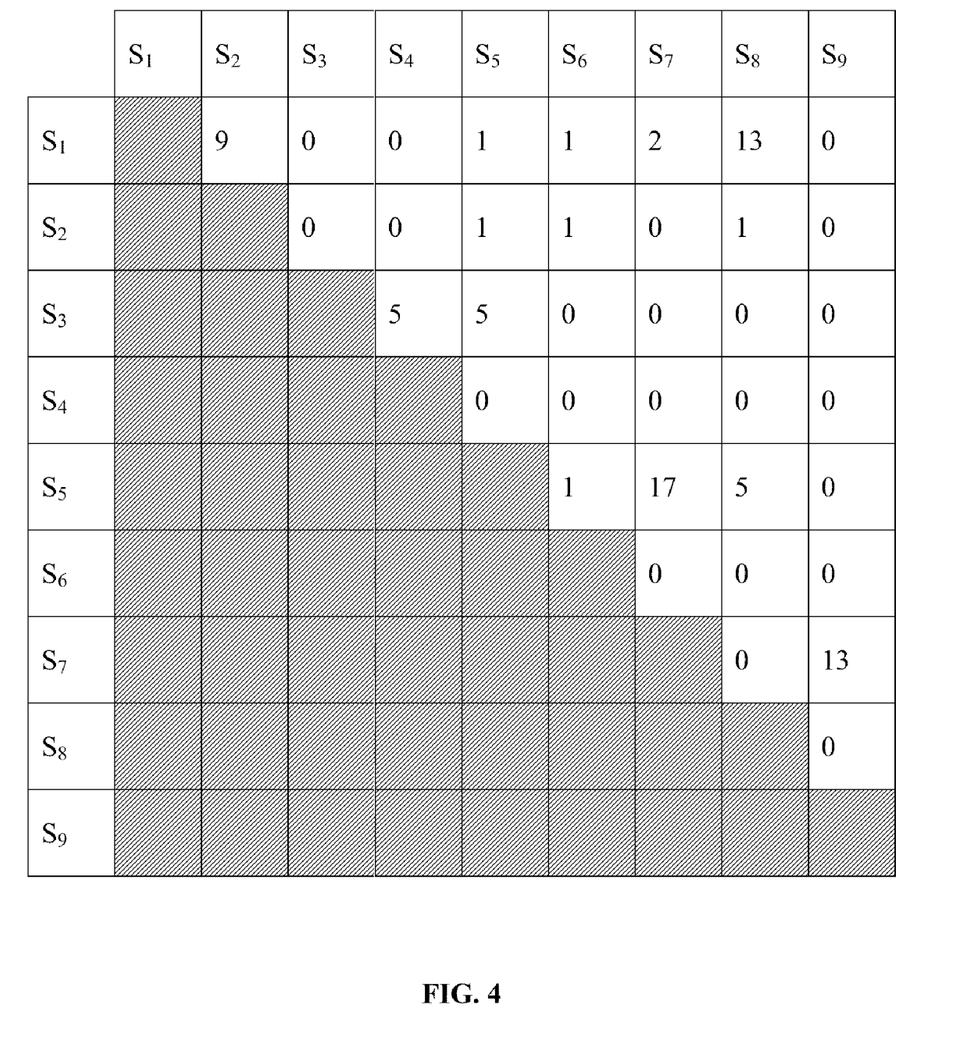
FIG. 4 is a diagonal matrix showing the matches found between multimedia data elements.

In S340 matches are performed between each signature of a cluster in the rows of the matrix and the signatures of the other clusters, and storing the match result value in the appropriate cell of the matrix. This process is further explained in more detail below. It should be noted that a multimedia data element or for that matter, a cluster, is not matched to itself, i.e., a signature is not matched to itself, and in the case of a cluster, two clusters will not be matched if the same element is present in the two clusters being compared. In S350 it is determined whether there is at least a match that is above a predetermined threshold. It should be noted that as the process is an iterative process, that a different threshold value may be used as iterations advance. In S360, if a match is above or equal to a predetermined threshold, then execution continues with S370; otherwise, execution continues with S380 which causes, for example, the storage of the matrix results in a storage, or sending a report to the system of completion of the determination of the unsupervised clustering process. In S370 clusters are formed from the clusters that were determined to be above the predetermined threshold. These new clusters are now arranged in a matrix similar to the initial matrix but containing fewer rows and columns as a result of the clustering process. An exemplary initial cluster is shown in FIG. 4 and an exemplary secondary cluster, comprised of the clusters of clusters is provided, for example in FIG. 5, and are discussed in more detail below. In one embodiment of the invention signatures are not generated for the multimedia data elements and comparison is performed directly between the multimedia data elements.

One of the advantages of using the signatures for the purpose of the clustering process is the speed in which such comparison can be performed as well as the lesser amount of resources required. Furthermore, the process using signatures is highly scalable and advantageous in the ever increasing amounts of multimedia data elements being made available. It should be further noted, that it is easy to add an additional multimedia data element once the initial matrix was created. When applicable, a signature of the newly added multimedia data element is created. A row and a column are added to the matrix and the clustering process described above is repeated. Similarly, removal of a multimedia data element requires only the removal of the respective row and column of that multimedia data element and repeating the clustering process.

Reference is now made to FIGS. 4 through 7 where exemplary and non-limiting tables of the clustering process in accordance with the invention are shown. In FIG. 4 signature S1 through S9 are matched, at each match a score of the level of the match is provided. For example, it is determined that the score for the match between S1 and S2 is "9" while the score of the match between S5 and S8 is "5". According to the process, a threshold is now applied to determine which two signatures will be in a cluster. Assuming a threshold value of "4", then while S3 and S4 will be grouped in a cluster as the score exceeds the threshold, S5 and S6 are not clustered because their score is less than the threshold. A group of seven clusters is therefore identified based on this criteria and these are: {S1,S2}, {S1,S8}, {S3,S4}, {S3,S5}, {S5,S7}, {S5,S8} and {S7,S9}.

Figure 5:
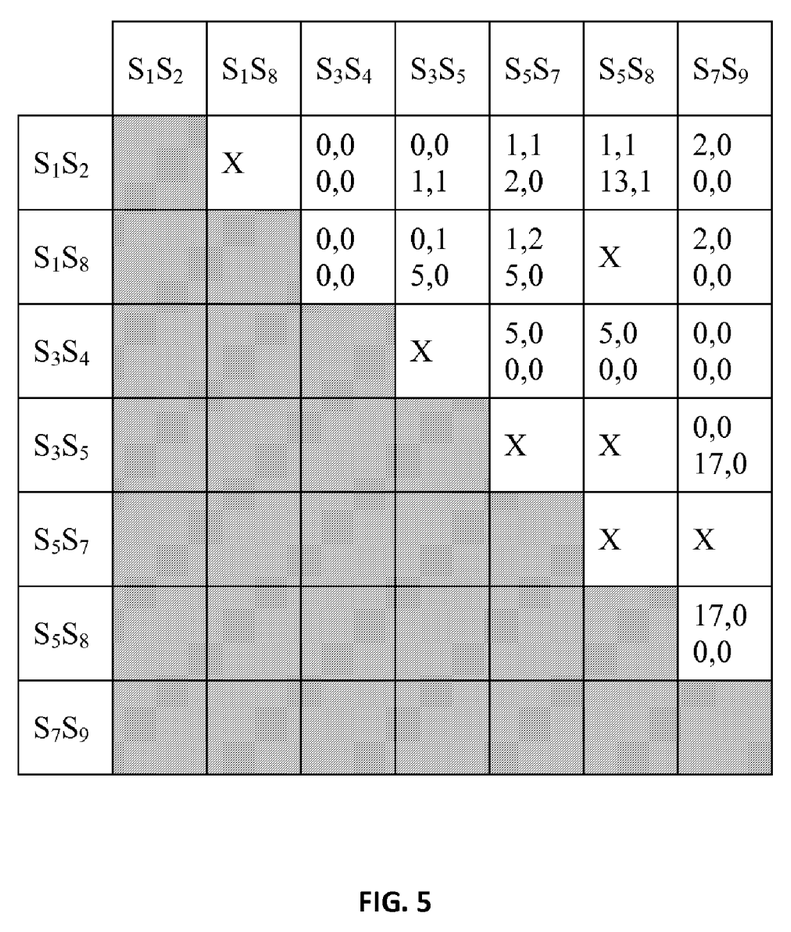
FIG. 5 is a diagonal matrix showing first level clusters of matched multimedia data elements.

FIG. 5 now shows the results of matches between the selected clusters, where no cluster is matched to itself and each matching occurs only once. Furthermore, in accordance with the method two items are not matched if a signature Si (i=1, 2, . . . 9) is present in both clusters being matched. For example, the clusters {S1,S2} and {S1,S8} are not matched as the signature S1 appears in both. This is denoted by an "X" to show that no matching is made. Where matches take place the score from the table shown in FIG. 4 is entered, so in each entry there will be four score values. For example, in the entry for the pair {S1,S2} and {S3,S4} the values "0,0,0,0" are entered, while for {S1,S2} and {S5,S8} the values "1,1,13,1" are entered.

Figure 6:
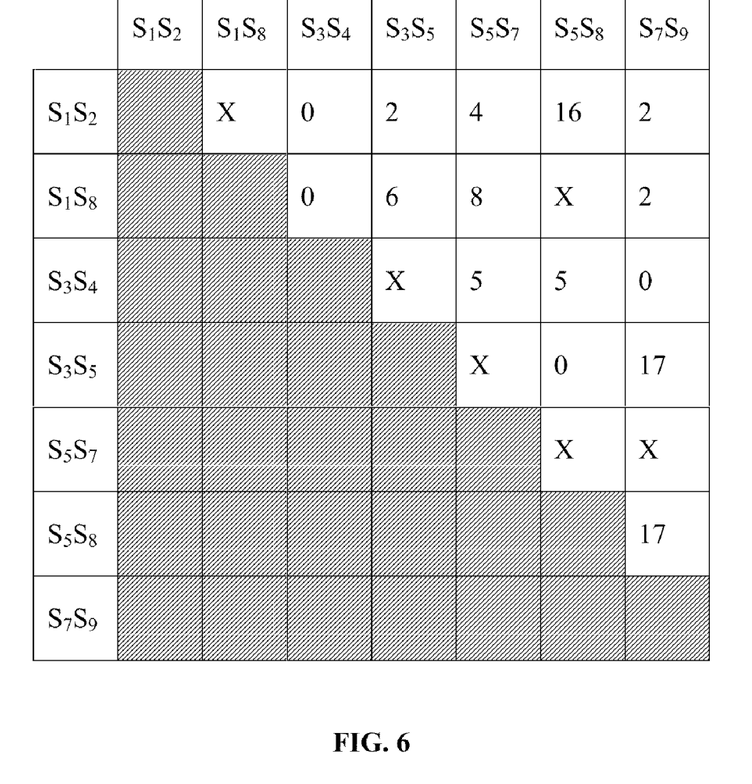
FIG. 6 is a diagonal matrix showing the cumulative match score for the clusters.
Figure 7:
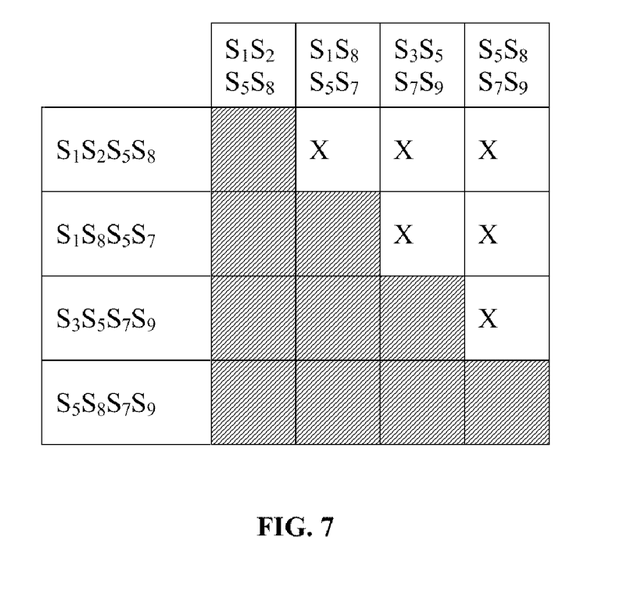
FIG. 7 is a diagonal matrix showing a second level of clustering.

FIG. 6 now shows the cumulative score result where the scores entered into each entry are summed up, therefore, for the pairs {S1,S2} and {S3,S4} the score is "0" while for the pairs {S1,S2} and {S5,S8} the score is "16". The clustering process may now continue for another iteration. Assuming a threshold value of "8", i.e., only clusters that have a score of 8 or more may be clustered, it can be seen that only four new clusters can be achieved: {S1,S2,S5,S8} having a score of "16", {S1,S8,S5,S7} having a score of "8", {S3, S5,S7,S9} having a score of "17" and {S5,S8, S7,S9} also having a score of "17". Now the process of a 4×4 matrix takes place and shown in FIG. 7. As can be seen in all combinations there is a repeat of at least one signature in two clusters that are to be matched as in this case no score is determined all locations are marked with an "X". However, in other examples it is possible that this would not have occurred. In such a case the score would have been determined and checked against the prevailing threshold for that iteration. The process ceases once it is not possible any more to create new clusters which will happen once a single cluster is created, or it is not possible to have any more matches, or otherwise, the match is found to be below a defined threshold value.

The unsupervised clustering process maps a certain content-universe onto a hierarchical structure of clusters. The content-elements of the content-universe are mapped to signatures, when applicable. The signatures of all the content-elements are matched to each other, and consequently generate the inter-match matrix. The described clustering process leads to a set of clusters. According to one embodiment of the invention, each cluster is represented by a small/compressed number of signatures, for example signatures generated by The Architecture as further explained hereinabove, which can be increased by variants. This structure results in a highly compressed representation of the content-universe.

In one embodiment of the invention a connection graph between the multimedia data elements of a cluster may be stored. The graph can then be used to assist a user searching for data to move along the graph in the search of a desired multimedia data element. In another embodiment, upon determination of a cluster, a signature for the whole cluster may be generated based on the signatures of the multimedia data elements that belong to the cluster. It should be appreciated that using a Bloom filter may be used to reach such signatures. Furthermore, as the signatures in accordance with the principles of the disclosed invention are correlated to some extent, the hash functions of the Bloom filter may be replace by simpler pattern detectors, with the Bloom filter being the upper limit.

While signatures are used here as the basic data elements, it should be realized that other data elements may be clustered using the principles of the invention. For example, a system generating data items is used, where the data items generated may be clustered according to the disclosed principles. Such data elements may be, without limitation, multimedia data elements. The clustering process may be performed by dedicated hardware or using a computing device having storage to store the data elements generated by the system and then performing the process described herein above. Then, the clusters can be stored in memory for use as may be deemed necessary.

Moreover, the principles of the invention are implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method for clustering a plurality of data elements, comprising:
   receiving a plurality of cluster elements, each cluster element containing at least a data element;
   generating a clustering score for each cluster element of the plurality of cluster elements versus all other cluster elements of the plurality of cluster elements using a computing device;
   determining a size of a diagonal matrix having a size corresponding to the number of the plurality of cluster elements;
   placing the clustering score in the diagonal matrix in storage, one clustering score for each pair of cluster elements;
   creating a new cluster element for each two cluster elements in the diagonal matrix having a clustering score that exceeds a threshold and
   do not contain one or more overlapped data elements, wherein the clustering score of a new cluster element is the summation of the clustering scores of combination of the data elements belong respectively to the different cluster elements creating the new cluster element;
   repeating the creation of new cluster elements using the created new cluster elements until a single cluster is attained or until it is determined that a single cluster cannot be reached; and
   storing the generated new cluster elements in the storage.

2. The method of claim 1, wherein the single cluster cannot be reached when no two cluster elements have a clustering score above a threshold or no clustering element can be clustered with other clustering elements.

3. The method of claim 1, wherein each of the data elements is a multimedia data element comprising at least one of: audio, image, video, a video frame, fragment of audio, fragment of image, fragment of video, a fragment of a video frame, and any combination thereof.

4. The method of claim 1, further comprising:
   associating at least a portion of metadata of a data element of a first cluster element with at least another data element of the first cluster.

5. The method of claim 1, further comprising:
   generating for each of the cluster elements a respective signature.

6. The method of claim 1, wherein the data element is a signature generated by a plurality of computational cores enabled to receive a plurality of multimedia data elements, each computational core having properties for independency from other of the computational cores, wherein each computational core generates responsive to multimedia data elements a respective first signature element and a respective second signature element, the first signature element being a robust signature, and wherein the multimedia data elements are at least one of: audio, image, video, a video frame, fragment of audio, fragment of image, fragment of video, a fragment of a video frame, and any combination thereof.

7. The method of claim 6, wherein the respective signature is generated by the plurality of computational cores.

8. The method of claim 7, wherein generating the respective signature further comprising:
   applying a Bloom filter on signatures of multimedia data elements of a cluster of the cluster elements.

9. The method of claim 8, wherein applying the Bloom filter comprising:
   detecting a pattern of the signatures of data elements of a cluster of the cluster elements.

10. The method of claim 6, further comprising:
    setting the properties of each of the plurality of computational cores to have at least some statistical independency from other of the plurality of computational cores, the properties being set independently of each other core.

11. An apparatus for clustering a plurality of data elements, comprising:
    a source of cluster elements for clustering, each cluster element containing at least a data element;
    a storage; and
    a clustering unit adapted to perform at least:
    generating a clustering score for each cluster element of the plurality of cluster elements versus all other cluster elements of the plurality of cluster elements using a computing device;
    determining a size of a diagonal matrix having a size corresponding to the number of the plurality of cluster elements;
    placing the clustering score in the diagonal matrix in storage, one clustering score for each pair of cluster elements;

creating a new cluster element for each two cluster elements in the diagonal matrix having a clustering score that exceeds a threshold and do not contain one or more overlapped data elements, wherein the clustering score of a new cluster element is the summation of the clustering scores of combination of the data elements belong respectively to the different cluster elements creating the new cluster element; and repeating the creation of new cluster elements using the created new cluster elements until a single cluster is attained or until it is determined that a single cluster cannot be reached;

wherein generated new cluster elements are stored in the storage.

12. The apparatus of claim 11, wherein the single cluster cannot be reached when no two cluster elements have a clustering score above a threshold or no clustering element can be clustered with other clustering elements.

13. The apparatus of claim 11, wherein each of the data elements is a multimedia data element comprising at least one of: audio, image, video, a video frame, fragment of audio, fragment of image, fragment of video, a fragment of a video frame, and any combination thereof.

14. The apparatus of claim 11, wherein the clustering unit is further adapted for:

associating at least a portion of metadata of a data element of a first cluster element with at least another data element of the first cluster.

15. The apparatus of claim 11, further comprises a plurality of computational cores, wherein the data element is a signature generated by the plurality of computational cores enabled to receive a plurality of multimedia data elements, each computational core having properties for independency from other of the computational cores, wherein each computational core generates responsive to multimedia data elements a respective first signature element and a respective second signature element, the first signature element being a robust signature, and wherein the multimedia data elements are at least one of: audio, image, video, a video frame, fragment of audio, fragment of image, fragment of video, a fragment of a video frame, and any combination thereof.

16. The apparatus of claim 15, wherein the clustering unit is further adapted for:

generating for each of the cluster elements a respective signature.

17. The apparatus of claim 16, wherein the respective signature is generated by the plurality of computational cores.

18. The apparatus of claim 17, wherein generating the respective signature further comprising:

applying a Bloom filter on signatures of multimedia data elements of a cluster of the cluster elements.

19. The apparatus of claim 18, wherein applying the Bloom filter comprising:

detecting a pattern of the signatures of data elements of a cluster of the cluster elements.

20. The apparatus of claim 15, further comprising:

setting the properties of each of the plurality of computational cores to have at least some statistical independency from other of the plurality of computational cores, the properties being set independently of each other core.

* * * * *